(12) United States Patent
Tzikas et al.

(10) Patent No.: US 7,905,928 B2
(45) Date of Patent: Mar. 15, 2011

(54) REACTIVE DYES, PROCESSES FOR THEIR PREPARATION AND THEIR USE

(75) Inventors: Athanassios Tzikas, Dornach (CH); Thomas Verdugo, Arlesheim (CH); Georg Roentgen, Freiburg (DE)

(73) Assignee: Huntsman International LLC, The Woodlands, TX (US)

( * ) Notice: Subject to any disclaimer, the term of this patent is extended or adjusted under 35 U.S.C. 154(b) by 0 days.

(21) Appl. No.: 12/739,079

(22) PCT Filed: Oct. 7, 2008

(86) PCT No.: PCT/EP2008/063373
§ 371 (c)(1),
(2), (4) Date: Apr. 21, 2010

(87) PCT Pub. No.: WO2009/053238
PCT Pub. Date: Apr. 30, 2009

(65) Prior Publication Data
US 2010/0251490 A1    Oct. 7, 2010

(30) Foreign Application Priority Data
Oct. 25, 2007   (EP) .................................... 07119331

(51) Int. Cl.
*C09B 62/00*   (2006.01)
*C07D 498/00*  (2006.01)

(52) U.S. Cl. .............. 8/549; 8/449; 8/562; 8/565; 8/576; 8/115.54; 544/76; 544/77

(58) Field of Classification Search .............. 8/449, 549, 8/462, 565, 576, 115.45; 544/76, 77
See application file for complete search history.

(56) References Cited

U.S. PATENT DOCUMENTS

| | | | |
|---|---|---|---|
| 4,786,728 A | 11/1988 | Schwaiger et al. | |
| 4,841,049 A * | 6/1989 | Seitz ................................ | 544/76 |
| 4,898,944 A | 2/1990 | Schwaiger et al. | |
| 5,772,698 A | 6/1998 | Reichert et al. | |
| 6,281,339 B1 | 8/2001 | Lehmann et al. | |

FOREIGN PATENT DOCUMENTS

| | | |
|---|---|---|
| DE | 1225789 B | 9/1966 |
| EP | 0112797 A | 7/1984 |
| EP | 0222098 A | 5/1987 |
| EP | 0260227 A | 3/1988 |
| EP | 0739950 A | 10/1996 |
| EP | 1085056 A | 3/2001 |

OTHER PUBLICATIONS

STIC Search Report dated Sep. 30, 2010.*

* cited by examiner

*Primary Examiner* — Eisa B Elhilo

(57) ABSTRACT

Reactive dyes of the formula (1)

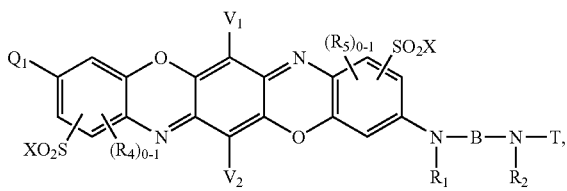

in which $Q_1$, X, $V_1$, $V_2$, B, T and $R_1$, $R_2$, $R_4$ and $R_5$ are defined in the claims and in the disclosure and wherein the reactive dyes are suitable for dyeing widely varying fiber materials, in particular cellulosic fiber materials and produce dyeings with good allround properties.

10 Claims, No Drawings

REACTIVE DYES, PROCESSES FOR THEIR PREPARATION AND THEIR USE

CROSS REFERENCE TO RELATED APPLICATIONS

This application is the National Phase of International Application PCT/EP2008/063373 filed Oct. 7, 2008 which designated the U.S. and which claims priority to European Patent Application (EP) 07119331.2 filed Oct. 25, 2007. The noted applications are incorporated herein by reference.

FIELD OF THE INVENTION

The present invention relates to novel unsymmetric and symmetric dioxazine dyes which are fibre-reactive, processes for their preparation and their use for dyeing or printing fibre materials.

BACKGROUND OF THE INVENTION

The practice of dyeing using reactive dyes has recently led to increased requirements regarding the quality of the dyeings and the profitability of the dyeing process. There consequently continues to be a demand for novel reactive dyes which have improved properties, in particular in respect of application.

Reactive dyes which have a high degree of exhaustion and a high degree of fixing, in particular no alkaline after-treatment for removal of unfixed dye being necessary, are nowadays required for dyeing. These dyes should furthermore have a good tinctorial yield and a high reactivity. U.S. Pat. No. 4,841,049 and U.S. Pat. No. 5,772,698 disclose fibre-reactive dioxazine dyes. However, the known dyes do not meet all of the requirements mentioned.

SUMMARY OF THE INVENTION

The present invention is therefore based on the object of providing novel, improved fibre-reactive dioxazine dyes for dyeing and printing fibre materials which have the qualities characterized above to a high degree. The novel dyes should have the distinctive features in particular of high degrees of exhaustion, high fixing yields and high fibre-dye bond stabilities. They should furthermore produce dyeings with good all-round properties, for example light- and wet-fastness properties.

DETAILED DESCRIPTION OF THE INVENTION

It has been found that the stated object is substantially achieved by the reactive dyes defined below.

The present invention thus provides reactive dyes of the formula

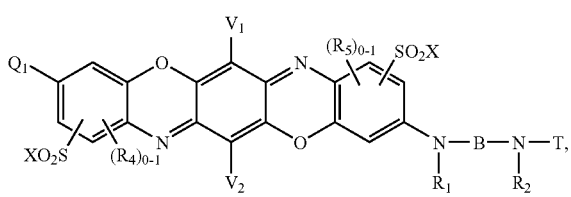

(1)

in which $Q_1$ is hydrogen, halogen or a radical of the formula

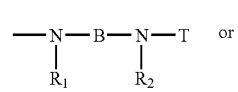

(2a)

(2b)

$R_1$, $R_2$ and $R_3$ independently of one another are hydrogen or $C_1$-$C_4$alkyl which is unsubstituted or substituted by hydroxyl, sulfo, carboxyl or sulfato, and $R_1$ in formula (1) and $R_1$ in formula (2a) have identical or different meanings and $R_2$ in formula (1) and $R_2$ in formula (2a) have identical or different meanings, $(R_4)_{0-1}$ and $(R_5)_{0-1}$ independently of one another are 0 or 1 identical or different substituents from the group consisting of $C_1$-$C_4$alkyl, $C_1$-$C_4$alkoxy, halogen and sulfo, A is hydrogen or $C_1$-$C_4$alkyl which is unsubstituted or substituted by hydroxyl, sulfo, carboxyl or sulfato, phenyl which is unsubstituted or substituted by $C_1$-$C_4$alkyl, $C_1$-$C_4$alkoxy, $C_2$-$C_4$alkanoylamino, hydroxyl, carboxyl, carbamoyl, sulfo or halogen, phenyl-$C_1$-$C_2$alkylene which is unsubstituted or substituted in the phenyl ring by $C_1$-$C_4$alkyl, $C_1$-$C_4$alkoxy, $C_2$-$C_4$alkanoylamino, hydroxyl, carboxyl, sulfa, carbamoyl or halogen, or $C_5$-$C_7$cycloalkyl which is unsubstituted or substituted by $C_1$-$C_4$alkyl, B is a $C_2$-$C_{12}$alkylene radical which can be interrupted by 1, 2 or 3 members from the group consisting of —NH—, —N(CH$_3$)— or —O— and is unsubstituted or substituted by hydroxyl, sulfo, sulfato, cyano or carboxyl, a $C_5$-$C_7$cycloalkylene radical or $C_1$-$C_2$alkylene-$C_5$-$C_7$cycloalkylene radical which are unsubstituted or substituted in the cycloalkylring by $C_1$-$C_4$alkyl, $C_1$-$C_2$alkylenephenylene radical or phenylene radical which are unsubstituted or substituted in the phenyl ring by $C_1$-$C_4$alkyl, $C_1$-$C_4$alkoxy, $C_2$-$C_4$alkanoylamino, sulfo, halogen or carboxyl, $V_1$ and $V_2$ independently of one another are halogen, T is a radical of the formula

  (3a),

  (3b) or

  (3c),

Hal is halogen,

X is hydroxyl or Y,

Y is vinyl or a radical —CH$_2$—CH$_2$—U and U is a group which can be split off under alkaline conditions, and m is the number 2, 3 or 4.

Halogen $Q_1$ is, for example, fluorine, chlorine or bromine, preferably flourine or chlorine and in particular fluorine.

Alkyl radicals $R_1$, $R_2$, $R_3$ and A are straight-chain or branched. The alkyl radicals can be further substituted by hydroxyl, sulfo, sulfato or carboxyl. Examples are the following radicals: methyl, ethyl, n-propyl, isopropyl, n-butyl, isobutyl, sec-butyl or tent-butyl, and the corresponding radicals substituted by hydroxyl, sulfo, sulfato or carboxyl. Preferred substituents are hydroxyl, sulfo or sulfato, in particular hydroxyl or sulfato and especially preferably sulfato.

$R_1$ in formula (1) and $R_1$ in formula (2a) have identical or different meanings. Preferably the meanings of $R_1$ are identical. $R_2$ in formula (1) and $R_2$ in formula (2a) have identical or different meanings. Preferably the meanings of $R_2$ are identical.

$C_1$-$C_4$alkyl $(R_4)_{0-1}$ and $(R_5)_{0-1}$ independently of one another are, for example, methyl, ethyl, n-propyl, isopropyl, n-butyl, sec-butyl, tert-butyl or isobutyl, preferably methyl or ethyl, and in particular methyl, the definitions and preferences also applying to the following $C_1$-$C_4$alkyl radicals, such as indicated for radical A in the meaning of phenyl, phenyl-$C_1$-$C_2$alkylene or $C_5$-$C_7$cycloalkyl each of which is substituted by $C_1$-$C_4$alkyl or for radical B in the meaning of $C_5$-$C_7$cycloalkylene, $C_1$-$C_2$alkylene-$C_5$-$C_7$cycloalkylene, $C_1$-$C_2$alkylenephenylene or each of which is substituted by $C_1$-$C_4$alkyl.

$C_1$-$C_4$alkoxy $(R_4)_{0-1}$ and $(R_5)_{0-1}$ independently of one another are, for example, methoxy, ethoxy, n-propoxy, isopropoxy, n-butoxy or isobutoxy, preferably methoxy or ethoxy and in particular methoxy, the definitions and preferences mentioned also applying to the following $C_1$-$C_4$alkoxy radicals, such as indicated for radical A in the meaning of phenyl or phenyl-$C_1$-$C_2$alkylene each of which is substituted by $C_1$-$C_4$alkoxy or for radical B in the meaning of $C_1$-$C_2$alkylenephenylene or phenylene each of which is substituted by $C_1$-$C_4$alkoxy.

Halogen $(R_4)_{0-1}$ and $(R_5)_{0-1}$ independently of one another are, for example, fluorine, chlorine or bromine, preferably chlorine or bromine and in particular chlorine, the definitions and preferences mentioned also applying to A in the meaning of phenyl which is substituted by halogen, B in the meaning of phenylene which is substituted by halogen and the following radicals which are substituted by halogen.

Phenyl-$C_1$-$C_2$alkylene A is, for example, benzyl and the corresponding radicals substituted in the phenyl ring by $C_1$-$C_4$alkyl, $C_1$-$C_4$alkoxy, $C_2$-$C_4$alkanoylamino, hydroxyl, carboxyl, sulfo, carbamoyl or halogen.

$C_5$-$C_7$cycloalkyl A is, for example, cyclopropyl or cyclohexyl, preferably cyclohexyl, and the corresponding radicals substituted by $C_1$-$C_4$alkyl.

$C_5$-$C_7$cycloalkylene B is, for example, cyclopropylene or cyclohexylene, preferably cyclohexylene, and the corresponding radicals substituted by $C_1$-$C_4$alkyl.

$C_1$-$C_2$alkylene-$C_5$-$C_7$cycloalkylene B is, for example, the radical of formula

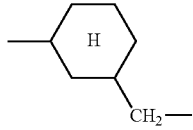

and the corresponding radicals substituted by $C_1$-$C_4$alkyl, such as the radical of formula

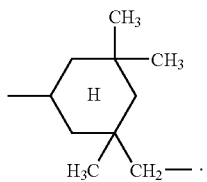

$C_1$-$C_2$alkylenephenylene B is, for example, benzylidene and the corresponding radicals substituted by $C_1$-$C_4$alkyl, $C_1$-$C_4$alkoxy, $C_2$-$C_4$alkanoylamino, sulfo, halogen or carboxyl.

$C_2$-$C_4$alkanoylamino generally means, for example, acetylamino or propionylamino, preferably acetylamino.

Halogen $V_1$ and $V_2$ independently of one another are, for example, fluorine, chlorine or bromine, preferably chlorine or bromine and in particular chlorine.

$V_1$ and $V_2$ are identical or non-identical, preferably identical.

A in the reactive dyes according to the invention is preferably hydrogen or $C_1$-$C_4$alkyl which is unsubstituted or substituted by hydroxyl, sulfo, carboxyl or sulfato, phenyl which is unsubstituted or substituted by $C_1$-$C_4$alkyl, $C_1$-$C_4$alkoxy, sulfo or halogen, phenyl-$C_1$-$C_2$alkylene which is unsubstituted or substituted in the phenyl ring by $C_1$-$C_4$alkyl, $C_1$-$C_4$alkoxy, sulfo or halogen, or $C_5$-$C_7$cycloalkyl which is unsubstituted or substituted by $C_1$-$C_4$alkyl.

A in the reactive dyes according to the invention is particularly preferably hydrogen, $C_1$-$C_4$alkyl which is unsubstituted or substituted by hydroxyl, sulfo, carboxyl or sulfato, preferably hydroxyl or sulfato, and in particular sulfato. The substituted alkyl radicals are preferred.

B is preferably a $C_2$-$C_{12}$alkylene radical, which can be interrupted by 1, 2 or 3 members —O— and is unsubstituted or substituted by hydroxyl, sulfo, sulfato, cyano or carboxyl, or a phenylene radical which is unsubstituted or substituted by $C_1$-$C_4$alkyl, $C_1$-$C_4$alkoxy, $C_2$-$C_4$alkanoylamino, sulfo, halogen or carboxyl.

B is particularly preferably a $C_2$-$C_6$alkylene radical, for example, 1,2-ethylene, 1,2-propylene, 1,3-propylene, 1,4-butylene, 1,3-butylene, 1,5-pentylene, 3,5-pentylene, 1,6-hexylene, 2,5-hexylene, 4,6-hexylene or the radical of formula

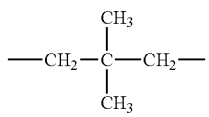

or

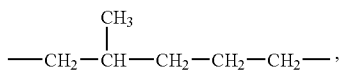

which can be interrupted by 1, 2 or 3 members —O— and is unsubstituted or substituted by hydroxyl or sulfato, and is preferably not interrupted by —O—.

Especially important bridge members B are 1,2-ethylene, 1,2-propylene or 1,3-propylene, in particular 1,2-ethylene or 1,2-propylene.

T is a carbonyl group containing fibre-reactive radical of the formula (3a), (3b) or (3c). Fibre-reactive radicals are understood as meaning those which are capable of reacting with the hydroxyl groups of cellulose, the amino, carboxyl, hydroxyl and thiol groups in wool and silk, or the amino and any carboxyl groups of synthetic polyamides to form covalent chemical bonds. The fibre-reactive radicals T are bonded to the chromophore radical via a diamino bridge member of the formula

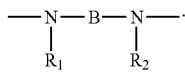

A group U which can be split off under alkaline conditions is, for example, —Cl, —Br, —F, —OSO$_3$H, —SSO$_3$H, —OCO—CH$_3$, —OPO$_3$H$_2$, —OCO—C$_6$H$_5$, —OSO$_2$—C$_1$-C$_4$alkyl, —OSO$_2$—N(C$_1$-C$_4$alkyl)$_2$, 3-carboxypyridin-1-yl or 3-carbamoylpyridin-1-yl. U is preferably a group of the formula —Cl, —OSO$_3$H, —SSO$_3$H, —OCO—CH$_3$, —OCO—C$_6$H$_5$ or —OPO$_3$H$_2$, in particular —Cl or —OSO$_3$H and particularly preferably —Cl.

Examples of suitable radicals Y are accordingly vinyl, β-bromo- or β-chloroethyl, β-acetoxyethyl, β-benzoyloxyethyl, β-phosphatoethyl, β-sulfotoethyl, β-thiosulfotoethyl, β-(3-carboxypyridin-1-yl)ethyl and β-(3-carbamoylpyridin-1-yl)ethyl. Y is preferably vinyl, β-chloroethyl or β-sulfotoethyl and in particular vinyl or β-chloroethyl.

m is preferably the number 2 or 3, and particularly preferably the number 3.

Hal is preferably bromine.

The radical of formula (3b) is preferably a radical —CO—CH(Br)—CH$_2$—Br. The radical of formula (3c) is preferably a radical —CO—C(Br)=CH$_2$.

R$_1$ and R$_2$ preferably independently of one another are hydrogen or C$_1$-C$_4$alkyl and in particular hydrogen.

R$_3$ preferably is hydrogen or C$_1$-C$_4$alkyl and in particular hydrogen.

R$_1$, R$_2$ and R$_3$ especially preferably are hydrogen.

Q$_1$ is preferably hydrogen, amino, fluorine or a radical of the formula (2a), wherein R$_1$, R$_2$, B and T are as defined and preferred above, particularly preferably R$_1$ and R$_2$ are hydrogen, B is 1,2-ethylene, 1,2-propylene or 1,3-propylene, T is a radical of the formula (3a), (3b) or (3c) as defined above, wherein Hal is bromine, Y is vinyl or β-chloroethyl, and m is the number 2 or 3.

Q$_1$ is especially preferably hydrogen, fluorine or a radical of the formula (2a), wherein R$_1$ and R$_2$ are hydrogen, B is 1,2-ethylene or 1,2-propylene, T is a radical of the formula (3a) as defined above, wherein Y is vinyl or β-chloroethyl, and m is the number 3.

In a very important embodiment of the present invention Q$_1$ is a radical of the formula (2a), wherein R$_1$, R$_2$, B and T are as defined and preferred above.

Preferably, the reactive dyes according to the invention have the formula (1a)

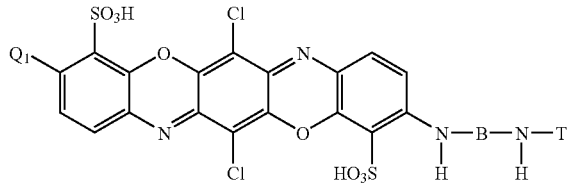

in which Q$_1$, B and T are as defined and preferred above, preferably

Q$_1$ is hydrogen, amino, flourine or a radical of the formula (2a),

B is 1,2-ethylene, 1,2-propylene or 1,3-propylene,

T is a radical of the formula (3a), (3b) or (3c), wherein

Hal is bromine,

Y is vinyl or β-chloroethyl, and m is the number 2 or 3.

Particularly preferably, the reactive dyes of the formula (1a) according to the invention are those in which Q$_1$ is hydrogen, fluorine or a radical of the formula (2a), preferably a radical of the formula (2a), B is 1,2-ethylene or 1,2-propylene, T is a radical of the formula (3a), wherein Y is vinyl or β-chloroethyl, and m is the number 3.

The present invention also relates to a process for the preparation of the reactive dyes according to the invention, which comprises subjecting a compound of the formula (4)

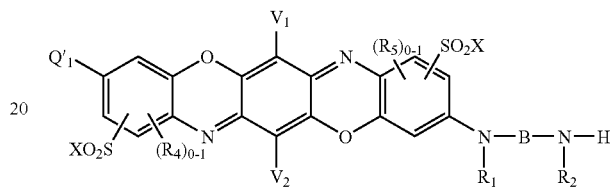

to a condensation reaction in any desired sequence with a compound of the formula

Z-T     (5), to give a compound of the formula (1)

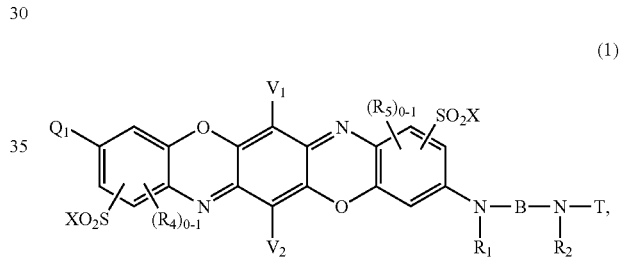

in which

Q'$_1$ is hydrogen, halogen or a radical of the formula

(2a')

(2b)

Q$_1$, R$_1$, R$_2$, R$_3$, (R$_4$)$_{0-1}$, (R$_5$)$_{0-1}$, A, B, V$_1$, V$_2$ and T are defined and preferred above, and Z is a leaving group, for example, chlorine.

Condensation of the compound of the formula (4) with the compound of the formula (5) is advantageously carried out in aqueous solution or suspension at low temperatures, for example, at 0 to 5° C., and at a neutral or, preferably, weakly alkaline to alkaline pH, for example at a pH of 7.5 to 11.5, the hydrogen chloride released during condensation being continuously neutralized by addition of, for example, aqueous alkali metal hydroxides, alkali metal carbonates or alkali metal bicarbonates.

Symmetric dioxazine dyes of the formula (1), i.e. dyes of formula (1) wherein Q$_1$ is a radical of the formula (2a), can be prepared, for example, by condensing about 1 mole equivalent of a compound of the formula

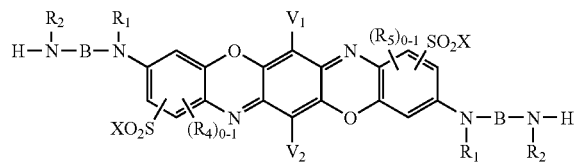

(4a)

with about 2 mole equivalents of a compound of the formula (5), in which the radicals are as defined and preferred above.

The compound of the formula (4a) can be obtained in a manner known per se, for example, by condensation of 2,3,5,6-tetrachloro-1,4-benzoquinone with the corresponding aromatic amines. The procedure can be, for example, such that about 1 mole equivalent of 2,3,5,6-tetrachloro-1,4-benzoquinone is condensed with about 1 mole equivalent each of the amines of the formula

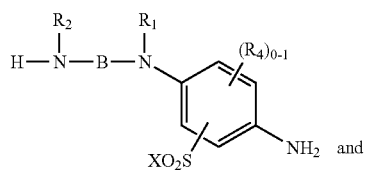

(6a)

and

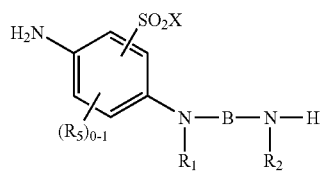

(7)

the resulting dianilide of formula

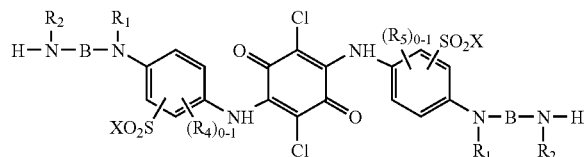

(8a)

is cyclized in the presence of an oxidizing agent, for example oleum, to the dioxazine.

Unsymmetric dioxazine dyes of the formula (1), i.e. dyes of formula (1) wherein $Q_1$ is hydrogen, halogen or a radical of the formula (2b) can be prepared, for example, by reacting about 1 mole equivalent of a compound of the formula

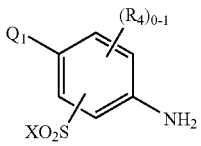

(6b)

with about 1 mole equivalent of a compound of the formula

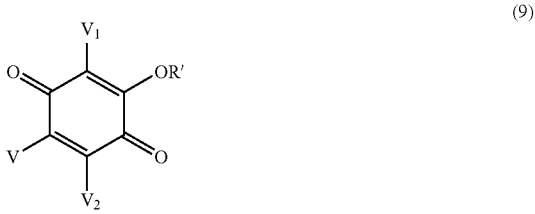

(9)

to give a compound of the formula

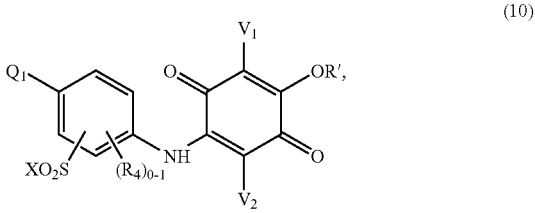

(10)

reacting about 1 mole equivalent of the compound of the formula (10) with about 1 mole equivalent of a compound of the formula

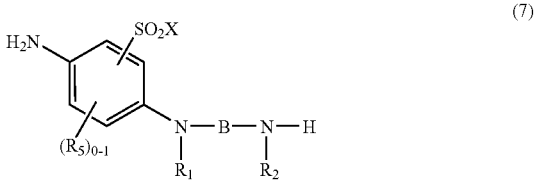

(7)

to give a compound of the formula

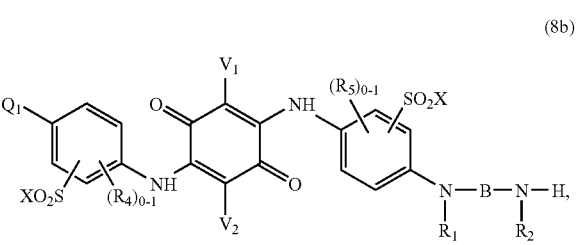

(8b)

cyclizing the compound of the formula (8b) to give a compound of the formula

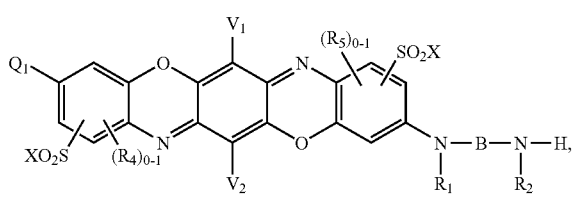

(4b)

and subjecting about 1 mole equivalent of the compound of the formula (4b) to a condensation reaction in any desired sequence with about 1 mole equivalent of a compound of the formula $$Z\text{-}T \qquad (5),$$

to give a compound of the formula (1)

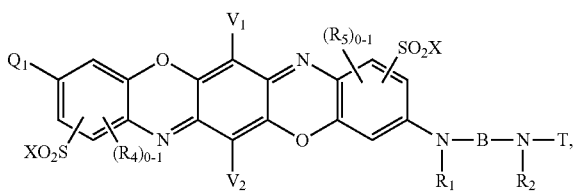

(1)

in which $Q_1$, $R_1$, $R_2$, $(R_4)_{0-1}$, $(R_5)_{0-1}$, B, $V_1$, $V_2$ and T are defined and preferred above, R' is $C_1$-$C_4$alkyl, for example methoxy, V is chlorine or bromine, and Z is a leaving group, for example, chlorine.

The compounds of the formula (5), (6a), (6b), (7) and (9) are known or can be obtained in a manner known per se.

If appropriate, the end product can also be subjected to a conversion reaction. Such a conversion reaction is, for example, the conversion of a vinylatable reactive group contained in T into its vinyl form by treatment with dilute sodium hydroxide solution, for example the conversion of the β-sulfotoethylsulfonyl or β-chloroethylsulfonyl group into the vinylsulfonyl radical or the conversion of the α,β-dihalopropionylamino group into the α-haloacryloylamino radical. Such reactions are known per se. The conversion reaction is generally carried out in neutral to alkaline medium at a temperature of, for example, from 20 to 70° C., at a pH value of, for example, from 6 to 14.

The reactive dyes of formula (1) according to the invention are either in the form of the free acid or, preferably, in the form of a salt thereof. Salts that come into consideration are, for example, the alkali metal, alkaline earth metal and ammonium salts or the salts of an organic amine. Sodium, lithium, potassium and ammonium salts and the salts of mono-, di- and tri-ethanolamine may be mentioned as examples.

The compounds of formula (1) according to the invention are suitable as dyes for dyeing and printing an extremely wide variety of materials, such as hydroxyl-group-containing or nitrogen-containing fibre materials. Examples of nitrogen-containing fibre materials that may be mentioned are silk, leather, wool, polyamide fibres and polyurethanes. The reactive dyes according to the invention are suitable especially for dyeing and printing cellulosic fibre materials of all kinds. Such cellulosic fibre materials are, for example, natural cellulosic fibres, such as cotton, linen and hemp, and also cellulose and regenerated cellulose, preferably cotton. The reactive dyes according to the invention are also suitable for dyeing or printing cellulosic blend fabrics, for example blends of cotton and polyamide fibres or especially blends of cotton and polyester fibres The reactive dyes according to the invention can be applied to the fibre material and fixed to the fibre in a variety of ways, especially in the form of aqueous dye solutions and print pastes. They are suitable both for the exhaust method and for dyeing in accordance with the pad-dyeing method, according to which the goods are impregnated with aqueous, optionally salt-containing, dye solutions and, after treatment with alkali or in the presence of alkali, the dyes are fixed, where appropriate with the action of heat or by storing for several hours at room temperature. After fixing, the dyeings or prints are rinsed thoroughly with cold and hot water, optionally with the addition of an agent that has a dispersing action and promotes the diffusion of unfixed dye.

The reactive dyes according to the invention are distinguished by high reactivity, good fixing ability and a very good build-up behaviour. They can accordingly be used in accordance with the exhaust dyeing method at low dyeing temperatures and require only short steaming times in the pad-steam method. The degrees of fixing are high and unfixed dye can be washed off easily, the difference between the degree of exhaust and the degree of fixing being remarkably small, that is to say the soaping loss being very low. The dyes according to the invention are also suitable especially for printing, more especially on cotton, but are equally suitable also for printing nitrogen-containing fibres, for example wool or silk or blend fabrics that include wool or silk.

The reactive dyes according to the invention can be used in combination with other reactive dyes, for example, the dyes of formula

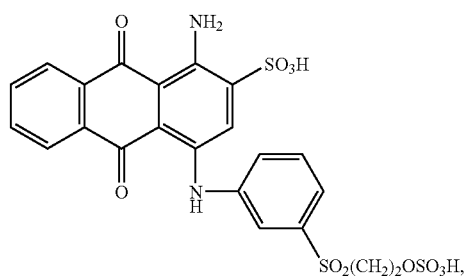

(11.1)

(11.2)
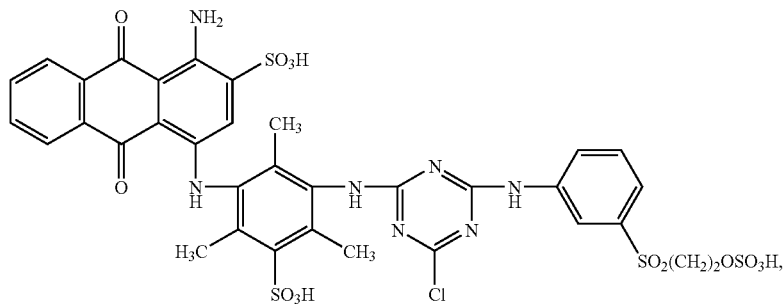
(11.3)
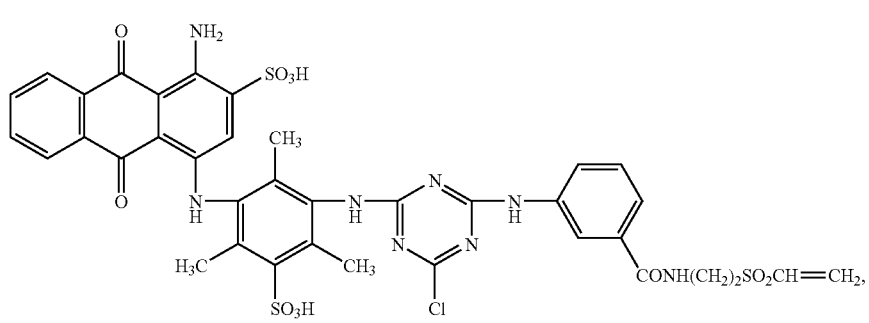
(11.4)
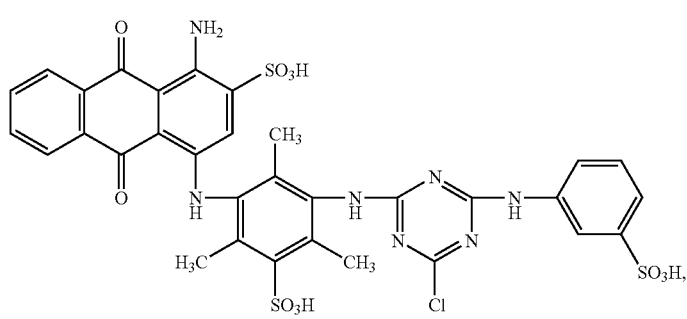
(11.5)
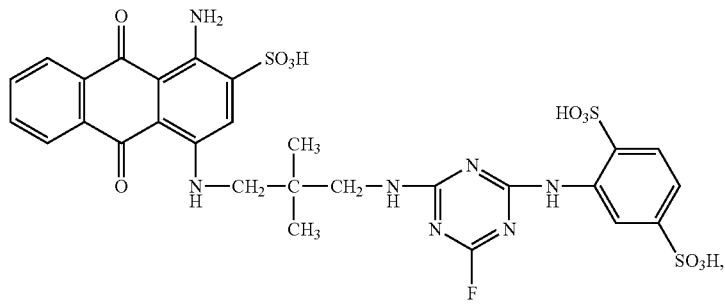
(11.6)
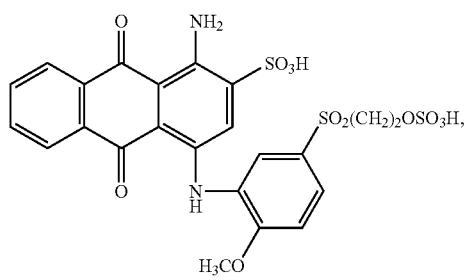

-continued
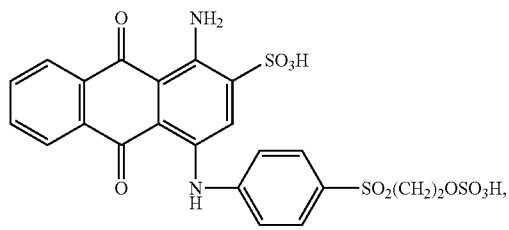
(11.7)
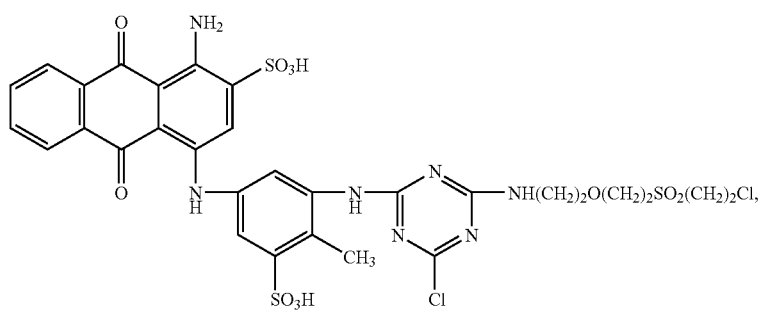
(11.8)
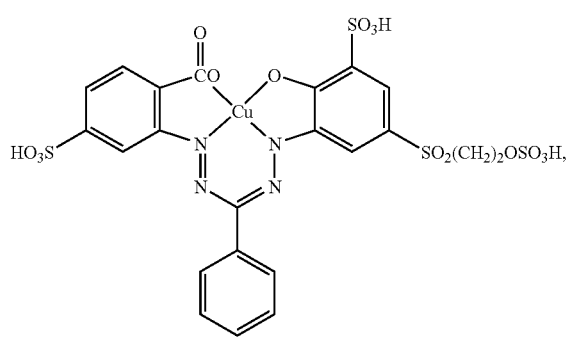
(12.1)
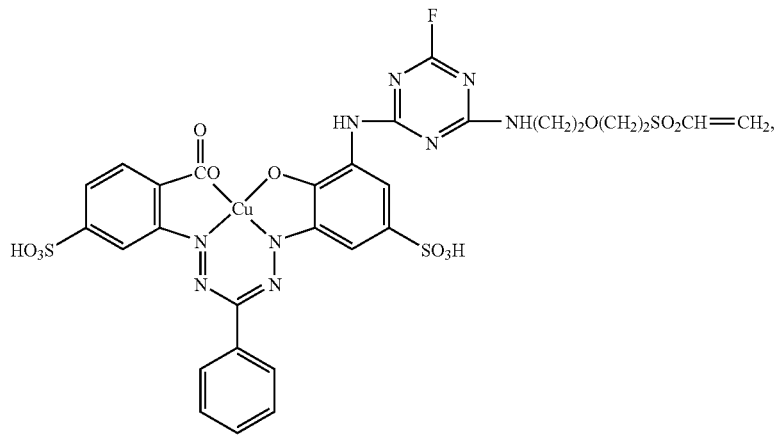
(12.2)

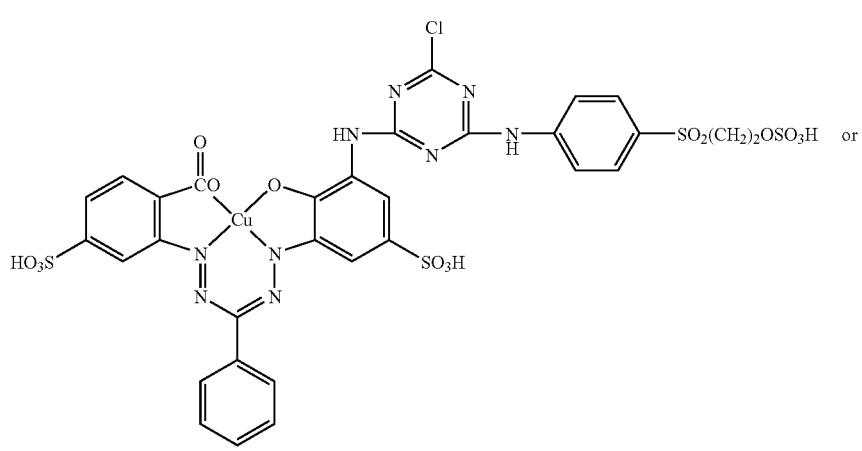
(12.3)

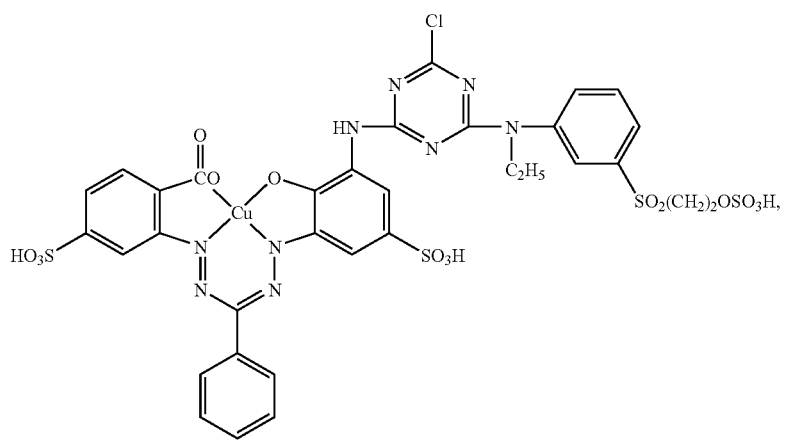
(12.4)

preferably the dye of formula 11.1, 12.1 or 12.2, particularly preferably the dye of formula 11.1.

The dyeings and prints produced using the reactive dyes according to the invention have a high tinctorial strength and a high fibre-dye binding stability in both the acidic and the alkaline range, and furthermore have good fastness to light and very good wet-fastness properties, such as fastness to washing, to water, to sea water, to cross-dyeing and to perspiration, as well as good fastness to chlorine, to pleating, to hot-pressing and to rubbing.

The dyes of formula (1) according to the invention are also suitable as colorants for use in recording systems. Such recording systems are, for example, commercially available ink-jet printers for paper or textile printing, or writing instruments, such as fountain pens or ballpoint pens, and especially ink-jet printers. For that purpose, the dyes according to the invention are first brought into a form suitable for use in recording systems. A suitable form is, for example, an aqueous ink, which comprises the dyes according to the invention as colorants. The inks can be prepared in customary manner by mixing together the individual components in the desired amount of water.

As substrates there come into consideration the above-mentioned hydroxyl-group-containing or nitrogen-containing fibre materials, especially natural or synthetic polyamide fibre materials. The fibre materials are preferably textile fibre materials.

Substrates that also come into consideration are paper and plastics films.

As examples of paper there may be mentioned commercially available ink-jet paper, photo paper, glossy paper, plastics-coated paper, e.g. Epson Ink-jet Paper, Epson Photo Paper, Epson Glossy Paper, Epson Glossy Film, HP Special Ink-jet Paper, Encad Photo Gloss Paper and Ilford Photo Paper. Plastics films are, for example, transparent or cloudy/opaque. Suitable plastics films are, for example, 3M Transparency Film.

Depending on the nature of the use, for example textile printing or paper printing, it may be necessary, for example, for the viscosity or other physical properties of the ink, especially properties that have an influence on the affinity for the substrate in question, to be adapted accordingly.

The dyes used in the aqueous inks should preferably have a low salt content, that is to say they should have a total content of salts of less than 0.5% by weight, based on the weight of the dyes. Dyes that have relatively high salt contents as a result of their preparation and/or as a result of the subsequent addition of diluents can be desalted, for example by membrane separation procedures, such as ultrafiltration, reverse osmosis or dialysis.

The inks preferably have a total content of dyes of from 1 to 35% by weight, especially from 1 to 30% by weight and preferably from 1 to 20% by weight, based on the total weight of the ink. The preferred lower limit in this case is a limit of 1.5% by weight, preferably 2% by weight and especially 3% by weight.

The inks may comprise water-miscible organic solvents, for example $C_1$-$C_4$ alcohols, e.g. methanol, ethanol, n-propanol, isopropanol, n-butanol, sec-butanol, tent-butanol or iso-butanol; amides, e.g. dimethylformamide or dimethylacetamide; ketones or ketone alcohols, e.g. acetone or diacetone alcohol; ethers, e.g. tetrahydrofuran or dioxane; nitrogen-containing heterocyclic compounds, e.g. N-methyl-2-pyrrolidone or 1,3-dimethyl-2-imidazolidone, poly-alkylene glycols, e.g. polyethylene glycol or polypropylene glycol; $C_2$-$C_6$alkylene glycols and thio-glycols, e.g. ethylene glycol, propylene glycol, butylene glycol, triethylene glycol, thiodiglycol, hexylene glycol and diethylene glycol; other polyols, e.g. glycerol or 1,2,6-hexanetriol; and $C_1$-$C_4$alkyl ethers of polyhydric alcohols, e.g. 2-methoxyethanol, 2-(2-methoxyethoxy)ethanol, 2-(2-ethoxyethoxy)ethanol, 2-[2-(2-methoxyethoxy)ethoxy]ethanol or 2-[2-(2-ethoxyethoxy)ethoxy]ethanol; preferably N-methyl-2-pyrrolidone, diethylene glycol, glycerol or especially 1,2-propylene glycol, usually in an amount of from 2 to 30% by weight, especially from 5 to 30% by weight and preferably from 10 to 25% by weight, based on the total weight of the ink.

In addition, the inks may also comprise solubilisers, e.g. ε-caprolactam.

The inks may comprise thickeners of natural or synthetic origin, inter alia for the purpose of adjusting the viscosity.

Examples of thickeners that may be mentioned include commercially available alginate thickeners, starch ethers or locust bean flour ethers, especially sodium alginate on its own or in admixture with modified cellulose, e.g. methyl cellulose, ethyl cellulose, carboxymethyl cellulose, hydroxyethyl cellulose, methyl hydroxyethyl cellulose, hydroxypropyl cellulose or hydroxypropyl methyl cellulose, especially with preferably from 20 to 25% by weight carboxy-methyl cellulose. Synthetic thickeners that may also be mentioned are, for example, those based on poly(meth)acrylic acids or poly(meth)acrylamides and also polyalkylene glycols having a molecular weight of, for example, from 2000 to 20 000, such as, for example, polyethylene glycol or polypropylene glycol or mixed polyalkylene glycols of ethylene oxide and propylene oxide.

The inks contain such thickeners, for example, in an amount of from 0.01 to 2% by weight, especially from 0.01 to 1% by weight and preferably from 0.01 to 0.5% by weight, based on the total weight of the ink.

The inks may also comprise buffer substances, e.g. borax, borates, phosphates, poly-phosphates or citrates. Examples that may be mentioned include borax, sodium borate, sodium tetraborate, sodium dihydrogen phosphate, disodium hydrogen phosphate, sodium tripoly-phosphate, sodium pentapolyphosphate and sodium citrate. They are used especially in amounts of from 0.1 to 3% by weight, preferably from 0.1 to 1% by weight, based on the total weight of the ink, in order to establish a pH value of, for example, from 4 to 9, especially from 5 to 8.5.

As further additives, the inks may comprise surfactants or humectants.

Suitable surfactants include commercially available anionic or non-ionic surfactants. As humectants in the inks according to the invention there come into consideration, for example, urea or a mixture of sodium lactate (advantageously in the form of a 50% to 60% aqueous solution) and glycerol and/or propylene glycol in amounts of preferably from 0.1 to 30% by weight, especially from 2 to 30% by weight.

Preference is given to inks having a viscosity of from 1 to 40 mPa·s, especially from 1 to 20 mPa·s and more especially from 1 to 10 mPa·s.

Furthermore, the inks may in addition comprise customary additives, e.g. anti-foams or especially preservatives that inhibit fungal and/or bacterial growth. Such additives are usually used in amounts of from 0.01 to 1% by weight, based on the total weight of the ink.

As preservatives there come into consideration formaldehyde-yielding agents, for example paraformaldehyde and trioxane, especially aqueous, approximately from 30 to 40% by weight formaldehyde solutions, imidazole compounds, for example 2-(4-thiazolyl)benzimidazole, thiazole compounds, for example 1,2-benzisothiazolin-3-one or 2-n-octyl-isothiazolin-3-one, iodine compounds, nitriles, phenols, haloalkylthio compounds or pyridine derivatives, especially 1,2-benzisothiazolin-3-one or 2-n-octyl-isothiazolin-3-one. A suitable preservative is, for example, a 20% by weight solution of 1,2-benzisothiazolin-3-one in dipropylene glycol (Proxel® GXL).

The inks may in addition comprise further additives, such as fluorinated polymers or telomers, for example polyethoxyperfluoroalcohols (Forafac® or Zonyl® products) in an amount of, for example, from 0.01 to 1% by weight, based on the total weight of the ink.

In the case of the ink-jet printing method, individual droplets of ink are sprayed onto a substrate from a nozzle in a controlled manner. It is mainly the continuous ink-jet method and the drop-on-demand method that are used for that purpose. In the case of the continuous ink-jet method, the droplets are produced continuously, droplets not required for the printing operation being discharged into a receptacle and recycled. In the case of the drop-on-demand method, on the other hand, droplets are generated as desired and used for printing; that is to say, droplets are generated only when required for the printing operation. The production of the droplets can be effected, for example, by means of a piezo ink-jet head or by thermal energy (bubble jet). Preference is given to printing by means of a piezo ink-jet head and to printing according to the continuous ink-jet method.

The present invention accordingly relates also to aqueous inks that comprise the dyes of formula (1) according to the invention and to the use of such inks in an ink-jet printing method for printing a variety of substrates, especially textile fibre materials, the definitions and preferences indicated above applying to the dyes, the inks and the substrates.

The following examples serve to illustrate the invention. Temperatures are in degrees Celsius, parts are parts by weight and the percentage data are percentages by weight, unless noted otherwise. Parts by weight bear the same relation to parts by volume as the kilogram to the liter.

Example 1

24.2 parts of 2,3,5-trichloro-6-methoxy-1,4-benzoquinone are stirred under reflux together with 2.3 parts of 5-amino-2-fluorobenzenesulfonic acid and 9 parts of anhydrous sodium acetate in 2500 parts of methanol for 3 hours. 2500 parts of water are added to the reaction mixture and the precipitate formed is filtered off, washed with water and dried. 22.5 parts of an orange-coloured powder which, in the form of the free acid, has the formula

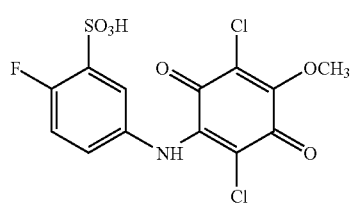

(101)

are obtained.

Example 2

41.0 parts of the powder obtained according to Example 1 are stirred with 24.5 parts of 5-amino-2-(2-aminopropylamino)benzenesulfonic acid in 500 parts of water, a pH of 8 being maintained with aqueous sodium hydroxide solution during the reaction. When the reaction has ended the brown precipitate formed is filtered off, washed with water and dried in vacuo. A compound which, in the form of the free acid, has the formula

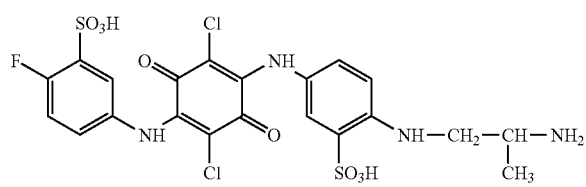

(102)

is obtained.

Example 3

62.4 parts of the finely ground compound from Example 2 are introduced in portions into 300 parts of 25% oleum. 55 parts of potassium peroxodisufate are added to the reaction mixture at 0° C. and the mixture is stirred at 0° C. for a further 3 hours. When the reaction has ended, the reaction mass is poured onto ice and partly neutralized with concentrated sodium hydroxide solution. The blue precipitate formed is filtered off, washed with water and dried in vacuo. A compound which, in the form of a free acid, has the formula

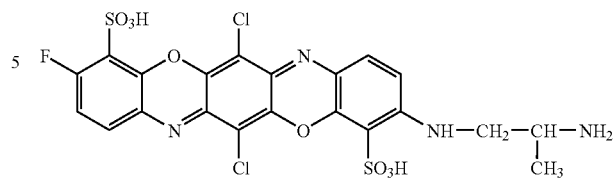

(103)

is obtained.

Example 4

33.6 parts of the compound according to Example 3 (90% dyestuff) are suspended in 800 parts of water at room temperature. 2.7 parts of lithium hydroxide monohydrate are added and the suspension is heated to 50° C., whereupon a solution is obtained. To this stirred solution 28.0 parts of γ-(β-chloroethylsulfonyl)butyryl chloride are added dropwise at 0-2° C. During addition the pH is kept at 10.8-11.0 by simultaneous addition of an aqueous sodium hydroxide solution (4N). The reaction mixture is allowed to adopt room temperature and the pH is adjusted to 8.0. 5.4 parts of acetic anhydride are added and the reaction mixture is stirred for another 30 minutes. Subsequently vinylation is carried out at pH 11 and at 30° C. by addition of aqueous sodium hydroxide solution. The reaction mixture is then neutralized with dilute hydrochloric acid. After clarifying filtration the filtrate is dialysed and freeze dried. A compound which, in the form of the free acid, has the formula

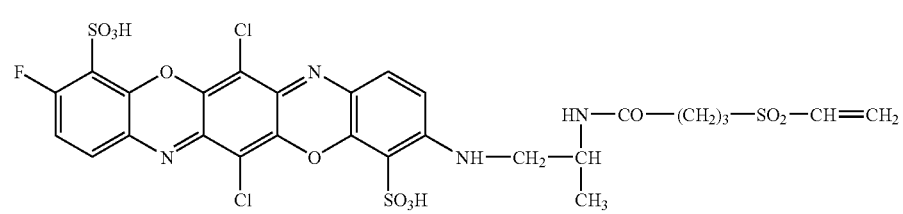

(104)

($\lambda_{max}$=582 nm) and dyes cotton in brilliant blue shades with good allround properties is obtained.

Example 5

27 parts of 2-chloro-5-nitrobenzenesulfonic acid are stirred together with 166 parts of 1,2-diaminopropane at room temperature for 8 hours. Excess 1,2-diaminopropane is then distilled off under reduced pressure, and the residue is taken up in water, neutralized with hydrochloric acid, and the solid material is filtered off and dried in vacuo to give 28 parts of N-(2-aminopropyl)-amino-4-nitroaniline-2-sulfonic acid as a yellow powder. This powder is then suspended in 300 parts of water and reduced at 40° C. with hydrogen and 3 parts of 5% Pd/C to give the diamino compound. After clarifying filtration, 12.3 parts of 2,3,5,6-tetrachloro-1,4-benzoquinone are added in portions to the reaction mixture at a temperature of 40 to 60° C., the pH being maintained at a constant value of 6.0 for about 12 hours by adding sodium hydroxide solution. The mixture is then allowed to cool, the resulting dianilide is filtered off, washed with water and dried in vacuo. The finely milled dianilide is introduced in portions into 620 parts of 5% oleum at a temperature of 0 to 5° C., 51 parts of potassium persulfate are added, and the reaction mixture is stirred for about 3 hours. It is then poured onto ice, and the pH is brought to a value of about 3 with sodium hydroxide solution. The blue precipitate is filtered off, washed with warm water and dried in vacuo at elevated temperature to give 49 parts of a compound of the formula

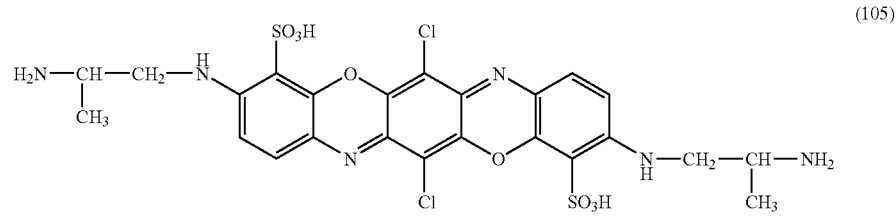

(105)

Example 6

36.6 parts of the compound according to Example 5 (90% dyestuff) are suspended in 800 parts of water at room temperature. 2.7 parts of lithium hydroxide monohydrate are added and the suspension is heated to 50° C., whereupon a solution is slowly obtained. To this stirred solution 56.0 parts of γ-(β-chloroethylsulfonyl)butyryl chloride are added dropwise at 0-2° C. During addition the pH is kept at 10.8-11.2 by simultaneous addition of an aqueous sodium hydroxide solution (4N). The reaction mixture is allowed to adopt room temperature and the pH is adjusted to 8.0. 5.4 parts of acetic anhydride are added and the reaction mixture is stirred for another 30 minutes. Subsequently vinylation is carried out at pH 11 and at 30° C. by addition of aqueous sodium hydroxide solution. The reaction mixture is then neutralized with hydrochloric acid. After clarifying filtration the filtrate is dialysed and freeze dried. A compound which, in the form of the free acid, has the formula

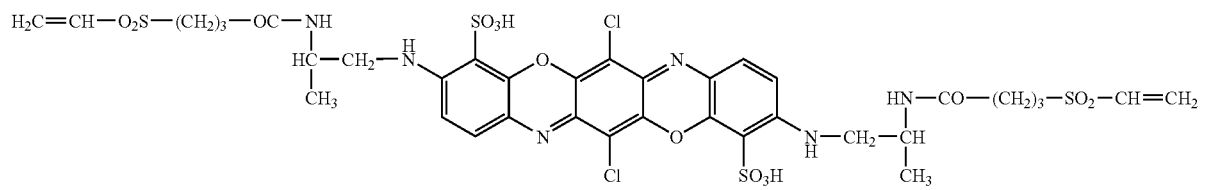

(106)

($\lambda_{max}$=628 nm) and dyes cotton in brilliant blue shades with good allround properties is obtained.

Example 7

40.0 parts of the compound of formula

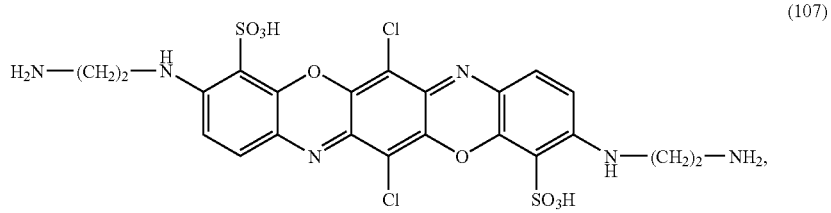

(107)

obtained in analogy to the procedure described in Example 5 (95% dyestuff) are suspended in 1200 parts of water at room temperature. 3.04 parts of lithium hydroxide monohydrate are added and the suspension is heated to 40° C., whereupon a solution is obtained. To this stirred solution 60.2 parts of α,β-dibromopropionyl chloride are added dropwise at 0-2° C. During addition the pH is kept at 10.3-10.7 by simultaneous addition of an aqueous sodium hydroxide solution (4N). The reaction mixture is allowed to adopt room temperature and the pH is adjusted to 8.0. 5.4 parts of acetic anhydride are added and the reaction mixture is stirred for another 30 minutes. The reaction mixture is then neutralized with concentrated hydrochloric acid. The precipitate is separated by filtration and dissolved in 650 parts of water. The solution is dialysed and freeze dried. A compound which, in the form of the free acid, has the formula

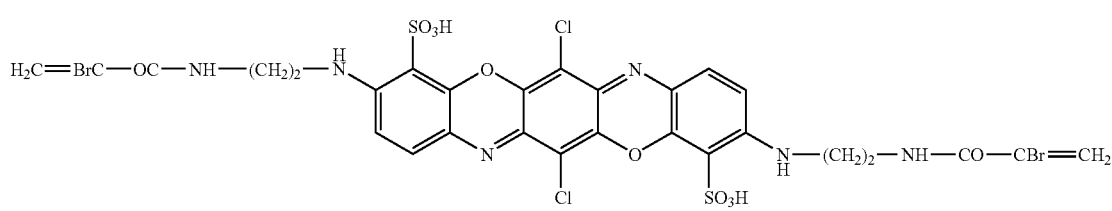

(108)

($\lambda_{max}$=623 nm) and dyes cotton in brilliant blue shades with good allround properties is obtained.

Example 8

33.2 parts of the compound of formula (107) obtained in analogy to the procedure described in Example 5 (95% dyestuff) are suspended in 900 parts of water at room temperature. 2.2 parts of lithium hydroxide monohydrate are added and the suspension is heated to 50° C., whereupon a solution is obtained. To this stirred solution 53.6 parts of γ-(β-chloroethylsulfonyl)butyryl chloride are added dropwise at 0-2° C. During addition the pH is kept at 10.9-11.1 by simultaneous addition of an aqueous sodium hydroxide solution (4N). The reaction mixture is allowed to adopt room temperature and the pH is adjusted to 8.0. 5.4 parts of acetic anhydride are added and the reaction mixture is stirred for another 30 minutes. The reaction mixture is then adjusted to pH 5 with hydrochloric acid. After clarifying filtration the filtrate is dialysed and freeze dried. A mixture of compounds which, in the form of the free acid, have the formulae

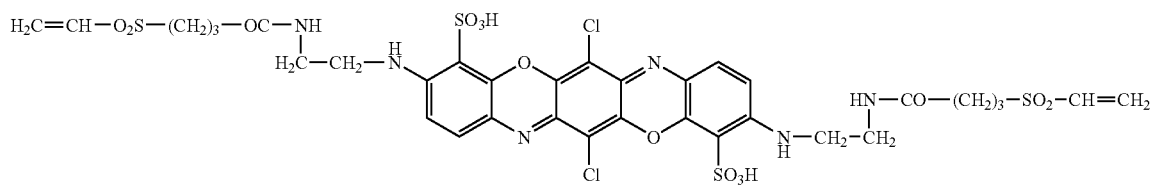

(109a)

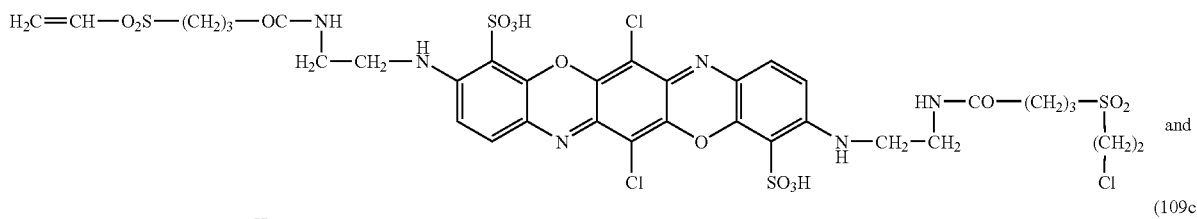

(109b)

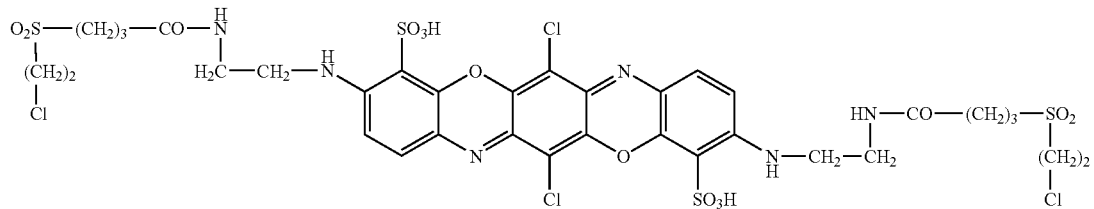

and (109c)

($\lambda_{max}$=623 nm) is obtained. The mixture dyes cotton in brilliant blue shades with good allround properties.

Examples 9 and 10

The following compounds which, in the form of the free acid, have the formulae given below can be prepared in a manner analogous to that described in the preceding Examples. The dyes dye cotton in brilliant blue shades with good allround properties.

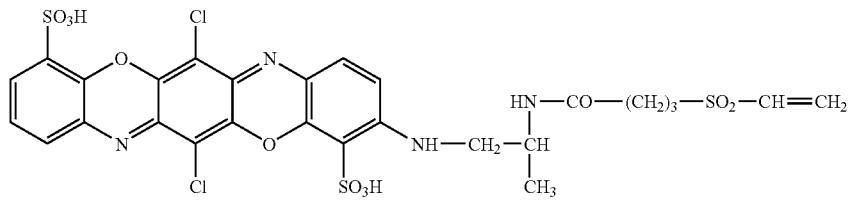

(110)

($\lambda_{max}$=585 nm)

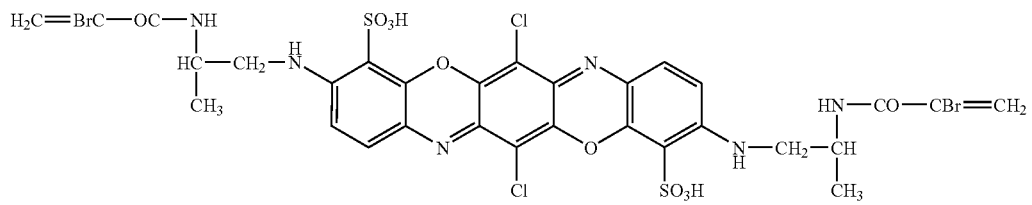

(111)

($\lambda_{max}$=622 nm)

Examples 11 to 23

The procedure described in Examples 5 and 6 is repeated, except that an amine of the formula

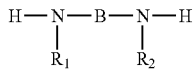

as defined in Table 1, column 2 is used in place of 1,2-diaminopropane. A compound which, in the form of the free acid, has the general formula

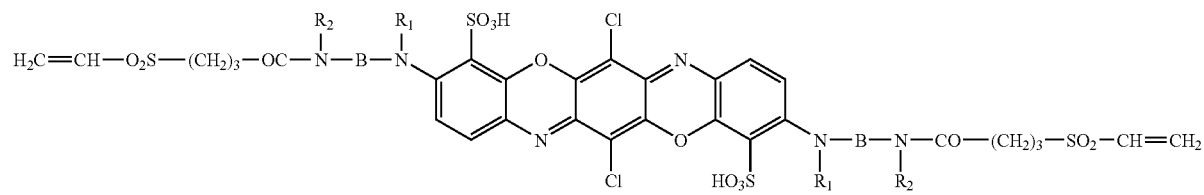

in which the radical

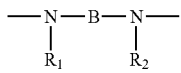

in each case is as defined in Table 1, column 3, is obtained. The dyes dye cotton in brilliant blue shades with good all-round properties.

TABLE 1

| Example ($\lambda_{max}$) | H—N(R$_1$)—B—N(R$_2$)—H | —N(R$_1$)—B—N(R$_2$)— |
|---|---|---|
| 11 (625) | H$_2$N—CH$_2$—CH$_2$—CH$_2$—NH$_2$ | —NH—CH$_2$—CH$_2$—CH$_2$—NH— |
| 12 (630) | H$_2$N—CH$_2$—CH$_2$—NH(CH$_3$) | —NH—CH$_2$—CH$_2$—N(CH$_3$)— |
| 13 (629) | HN(CH$_3$)—CH$_2$—CH$_2$—NH(CH$_3$) | —N(CH$_3$)—CH$_2$—CH$_2$—N(CH$_3$)— |
| 14 (623) | H$_2$N—(CH$_2$)$_3$—O—(CH$_2$)$_4$—O—(CH$_2$)$_3$—NH$_2$ | —NH—(CH$_2$)$_3$—O—(CH$_2$)$_4$—O—(CH$_2$)$_3$—NH— |
| 15 (621) | H$_2$N—(CH$_2$)$_2$—O—(CH$_2$)$_2$—O—(CH$_2$)$_2$—NH$_2$ | —NH—(CH$_2$)$_2$—O—(CH$_2$)$_2$—O—(CH$_2$)$_2$—NH— |
| 16 (631) | H$_2$N—CH$_2$—CH$_2$—NH(CH$_2$CH$_3$)— | —NH—CH$_2$—CH$_2$—N(CH$_2$CH$_3$)— |
| 17 (627) | H$_2$N—CH$_2$—C(CH$_3$)(CH$_3$)—CH$_2$—NH$_2$ | —NH—CH$_2$—C(CH$_3$)(CH$_3$)—CH$_2$—NH— |
| 18 (628) | H$_2$N—CH(C$_2$H$_5$)—CH$_2$—CH$_2$—NH$_2$ | —NH—CH(C$_2$H$_5$)—CH$_2$—CH$_2$—NH— |
| 19 (628) | H$_2$N—CH$_2$—CH(CH$_3$)—CH$_2$—CH$_2$—CH$_2$—NH$_2$ | —NH—CH$_2$—CH(CH$_3$)—CH$_2$—CH$_2$—CH$_2$—NH— |
| 20 (631) | H$_2$N—C$_6$H$_4$—CH$_2$—NH$_2$ | —NH—C$_6$H$_4$—CH$_2$—NH— |
| 21 (623) | H$_2$N—CH$_2$—CH(OH)—CH$_2$—NH$_2$ | —NH—CH$_2$—CH(OSO$_3$H)—CH$_2$—NH— |

TABLE 1-continued

| Example ($\lambda_{max}$) | H—N—B—N—H<br>　　$\|$　　$\|$<br>　　$R_1$　$R_2$ | —N—B—N—<br>　$\|$　　$\|$<br>　$R_1$　$R_2$ |
|---|---|---|
| 22 (629) | $H_2N$—⟨cyclohexyl-H⟩—$NH_2$ | —NH—⟨cyclohexyl-H⟩—NH— |
| 23 (632) | $H_2N$—⟨phenyl⟩—$NH_2$ | —NH—⟨phenyl⟩—NH— |

Examples 24 to 33

The procedure described in Examples 1 to 4 is repeated, except that an equimolar amount of an amine of the formula

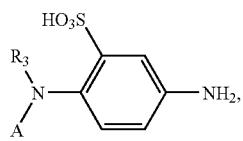

in which the radical —$NR_3A$ in each case is as defined in Table 2, column 2, is used in place of 20.3 parts of 5-amino-2-fluorobenzenesulfonic acid. A compound which, in the form of the free acid, has the general formula

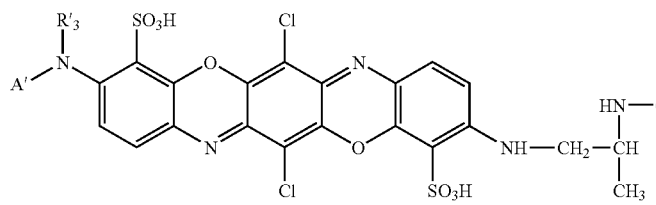

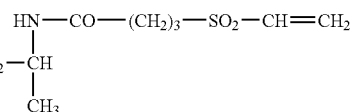

in which —$NR_3'A'$ in each case is as defined in Table 2, column 3, is obtained. The dyes dye cotton in brilliant blue shades with good allround properties.

TABLE 2

| Example ($\gamma_{max}$) | —$NR_3A$ | —$NR'_3A'$ |
|---|---|---|
| 24 (582) | —$NH_2$ | —$NH_2$ |
| 25 | —$N(CH_3)_2$ | —$N(CH_3)_2$ |
| 26 (590) | —NH—$CH_2$—$CH_3$ | —NH—$CH_2$—$CH_3$ |
| 27 (592) | —NH—$(CH_2)_3$—OH | —NH—$(CH_2)_3$—$OSO_3H$ |
| 28 (588) | —NH—$CH_2$—$CH(CH_3)$—OH | —NH—$CH_2$—$CH(CH_3)$—$OSO_3H$ |
| 29 (595) | $HO_3S$-⟨phenyl⟩-$NH_2$ | $HO_3S$-⟨phenyl⟩-NH— |

TABLE 2-continued

| Example ($\gamma_{max}$) | —$NR_3A$ | —$NR'_3A'$ |
|---|---|---|
| 30 | $CH_2$—$CH_2$—OH<br>$\|$<br>—N—$CH_2$—$CH_3$ | $CH_2$—$CH_2$—$OSO_3H$<br>$\|$<br>—N—$CH_2$—$CH_3$ |
| 31 | —$N(CH_2$—$CH_2$—$OH)_2$ | —$N(CH_2$—$CH_2$—$OSO_3H)_2$ |
| 32 (585) | —NH—$CH_2$—$CH_2$—$SO_3H$ | —NH—$CH_2$—$CH_2$—$SO_3H$ |
| 33 | —$N(CH_3)$—$CH_2$—$CH_2$—$SO_3H$ | —$N(CH_3)$—$CH_2$—$CH_2$—$SO_3H$ |

Exhaust dyeing: A cotton tricot fabric is introduced at 60° C. into an aqueous dyebath with a liquor ratio of 1:10 which contains the amount of the dyestuff prepared according to Example 6 or 8 and sodium chloride as indicated in Table 3.

TABLE 3

Composition of dyebaths 1 to 6 containing the dyestuff of Example 6 or 8

| | dyebath | | | | | |
|---|---|---|---|---|---|---|
| | 1 | 2 | 3 | 4 | 5 | 6 |
| %* of dyestuff | 0.5 | 1.0 | 2.0 | 4.0 | 6.0 | 8.0 |
| sodium chloride [g/l] | 40 | 50 | 60 | 90 | 100 | 100 |
| sodium carbonate [g/l] | 10 | 12 | 14 | 18 | 18 | 18 |

*% of dyestuff is with respect to the weight of the cotton fabric

After 45 minutes at 60° C. calcined sodium carbonate is added in the amount given in Table 3. Dyeing is continued for 45 minutes. The dyed goods are then rinsed with water, soaped and rinsed again and then dried.

The tinctorial strength of the dyeings obtained with the dyeing liquors 1 to 6 are measured photospectrometrically. Table 4 shows build-up properties of the dyestuffs prepared according to Examples 6 or 8. The dyestuffs show very good build-up properties.

TABLE 4

Build-up: dependence of reference depth (RD) from dyestuff concentration

| | % of dyestuff | | | | | | |
|---|---|---|---|---|---|---|---|
| | 0 | 0.5 | 1.0 | 2.0 | 4.0 | 6.0 | 8.0 |
| RD dyestuff of Ex 6 | 0 | 0.46 | 0.87 | 1.55 | 2.37 | 2.83 | 3.05 |
| RD dyestuff of Ex 8 | 0 | 0.34 | 0.66 | 1.17 | 2.02 | 2.51 | 2.78 |

Dyeing instructions I: 2 parts of the dyes obtained according to Example 8 are dissolved in 400 parts of water; 1500 parts of a solution which comprises 53 g of sodium chloride per liter are added: 100 parts of cotton fabric are introduced into this dyebath at 40° C. After 45 minutes, 100 parts of a solution which comprises 16 g of sodium hydroxide and 20 g of calcined sodium carbonate per liter are added. The temperature of the dyebath is kept at 40° C. for a further 45 minutes. Thereafter, the dyed goods are rinsed, soaped at the boil with a non-ionic detergent for a quarter of an hour, rinsed again and dried.

Dyeing instructions II: 2 parts of the reactive dyes obtained according to Example 8 are dissolved in 400 parts of water; 1500 parts of a solution which comprises 53 g of sodium chloride per liter are added. 100 parts of cotton fabric are introduced into this dyebath at 35° C. After 20 minutes, 100 parts of a solution which comprises 16 g of sodium hydroxide and 20 g of calcined sodium carbonate per liter are added. The temperature of the dyebath is kept at 35° C. for a further 15 minutes. Thereafter, the temperature is increased to 60° C. in the course of 20 minutes. The temperature is kept at 60° C. for a further 35 minutes. Thereafter, the goods are rinsed, soaped at the boil with a non-ionic detergent for a quarter of an hour, rinsed again and dried.

Dyeing instructions III: 8 parts of the reactive dyes obtained according to Example 8 are dissolved in 400 parts of water; 1400 parts of a solution which comprises 100 g of sodium sulfate per liter are added. 100 parts of cotton fabric are introduced into this dyebath at 25° C. After 10 minutes, 200 parts of a solution which comprises 150 g of trisodium phosphate per liter are added. Thereafter, the temperature of the dyebath is increased to 60° C. in the course of 10 minutes. The temperature is kept at 60° C. for a further 90 minutes. Thereafter, the goods are rinsed, soaped at the boil with a non-ionic detergent for a quarter of an hour, rinsed again and dried.

Dyeing instructions IV: 4 parts of the reactive dyes obtained according to Example 8 are dissolved in 50 parts of water. 50 parts of a solution which comprises 5 g of sodium hydroxide and 20 g of calcined sodium carbonate per liter are added. A cotton fabric is padded with the resulting solution such that it increases by 70% of its weight, and is then wound onto a roll. The cotton fabric is stored in this manner at room temperature for 3 hours. The dyed goods are then rinsed, soaked at the boil with a non-ionic detergent for a quarter of an hour, rinsed again and dried.

Dyeing instructions V: 6 parts of the reactive dyes obtained according to Example 8 are dissolved in 50 parts of water. 50 parts of a solution which comprises 16 g of sodium hydroxide and 0.04 liter of water-glass (38° bé) per liter are added. A cotton fabric is padded with the resulting solution such that it increases by 70% of its weight, and is then wound onto a roll. The cotton fabric is stored in this manner at room temperature for 10 hours. The dyed goods are then rinsed, soaped at the boil with a non-ionic detergent for a quarter of an hour, rinsed again and dried.

Dyeing instructions VI: 2 parts of the reactive dyes obtained according to Example 8 are dissolved in 100 parts of water with the addition of 0.5 part of sodium m-nitrobenzene sulfonate. A cotton fabric is impregnated with the resulting solution such that it increases by 75% of its weight, and is then dried. The fabric is then impregnated with a solution, warmed to 20° C., which comprises 4 g sodium hydroxide and 300 of sodium chloride per liter and squeezed off to a weight increase of 75%, and the dyeing is then steamed at 100 to 102° C. for 30 seconds, rinsed, soaped for a quarter of an hour in a 0.3% boiling solution of a non-ionic detergent, rinsed and dried.

Printing instructions I: 3 parts of the reactive dyes obtained according to Example 8 are sprinkled with high-speed stirring into 100 parts of a stock thickener comprising 50 parts of 5% sodium alginate thickener, 27.8 parts of water, 20 parts of urea, 1 part of sodium m-nitrobenzenesulfonate and 1.2 parts of sodium bicarbonate. A cotton fabric is printed with the printing paste thus obtained and dried and the printed material obtained is steamed in saturated steam at 102° C. for 2 minutes. The printed fabric is then rinsed; soaped at the boil and rinsed again, if appropriate, and then dried.

Printing instructions II: 5 parts of the reactive dyes obtained according to Example 8 are sprinkled with high-speed stirring into 100 parts of a stock thickener comprising 50 parts of 5% sodium alginate thickener, 36.5 parts of water, 10 parts of urea, 1 part of m sodium m-nitrobenzene sulfonate and 2.5 parts of sodium bicarbonate. A cotton fabric is printed with the printing paste thus obtained, the stability of which meets the technical requirements, and the resulting printed material is steamed in saturated steam at 102° C. for 8 minutes. The printed fabric is then rinsed, soaped at the boil and rinsed again, if appropriate, and then dried.

Printing Instructions III:

(a) Mercerised cotton satin is pad-dyed with a liquor containing 30 g/l of sodium carbonate and 50 g/l of urea (70% liquor pick-up) and dried.

(b) Using a drop-on-demand ink-jet head (bubble jet), the cotton satin pretreated according to Step (a) is printed with an aqueous ink containing 15% by weight of the reactive dyes according to Example 8, 15% by weight of 1,2-propylene glycol and 70% by weight of water.

The print is dried completely and fixed in saturated steam for 8 minutes at 102° C., cold-rinsed, washed off at the boil, rinsed again and dried.

What is claimed is:

1. A reactive dye of the formula

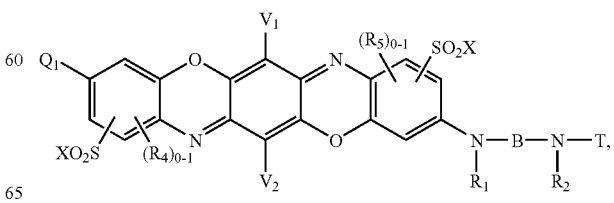

(1)

in which
Q₁ is hydrogen, halogen or a radical of the formula

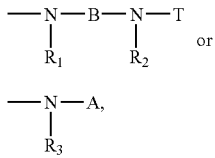   (2a)

or

—N—A,   (2b)
 |
 R₃

R₁, R₂ and R₃ independently of one another are hydrogen or $C_1$-$C_4$ alkyl which is unsubstituted or substituted by hydroxyl, sulfo, carboxyl or sulfato, and R₁ in formula (1) and R₁ in formula (2a) have identical or different meanings and R₂ in formula (1) and R₂ in formula (2a) have identical or different meanings, (R₄)₀₋₁ and (R₅)₀₋₁ independently of one another are 0 or 1 identical or different substituents from the group consisting of $C_1$-$C_4$ alkyl, $C_1$-$C_4$ alkoxy, halogen and sulfo, A is hydrogen or $C_1$-$C_4$ alkyl which is unsubstituted or substituted by hydroxyl, sulfo, carboxyl or sulfato, phenyl which is unsubstituted or substituted by $C_1$-$C_4$ alkyl, $C_1$-$C_4$ alkoxy, $C_2$-$C_4$ alkanoylamino, hydroxyl, carboxyl, carbamoyl, sulfo or halogen, phenyl-$C_1$-$C_2$ alkylene which is unsubstituted or substituted in the phenyl ring by $C_1$-$C_4$ alkyl, $C_1$-$C_4$ alkoxy, $C_2$-$C_4$ alkanoylamino, hydroxyl, carboxyl, sulfo, carbamoyl or halogen, or $C_5$-$C_7$ cycloalkyl which is unsubstituted or substituted by $C_1$-$C_4$ alkyl, B is a $C_2$-$C_{12}$ alkylene radical which can be interrupted by 1, 2 or 3 members from the group consisting of —NH—, —N(CH₃)— or —O— and is unsubstituted or substituted by hydroxyl, sulfo, sulfato, cyano or carboxyl, a $C_5$-$C_7$ cycloalkylene radical or $C_1$-$C_2$ alkylene-$C_5$-$C_7$ cycloalkylene radical which are unsubstituted or substituted in the cycloalkylring by $C_1$-$C_4$ alkyl, $C_1$-$C_2$ alkylenephenylene radical or phenylene radical which are unsubstituted or substituted in the phenyl ring by $C_1$-$C_4$ alkyl, $C_1$-$C_4$ alkoxy, $C_2$-$C_4$ alkanoylamino, sulfa, halogen or carboxyl, V₁ and V₂ independently of one another are halogen,
T is a radical of the formula —CO—(CH₂)ₘ—SO₂—Y   (3a), —CO—CH(Hal)-CH₂-Hal   (3b) or —CO—C(Hal)=CH₂   (3c), Hal is halogen,
X is hydroxyl or Y,
Y is vinyl or a radical —CH₂—CH₂—U and U is a group which can be split off under alkaline conditions, and
in is the number 2, 3 or 4.

2. A reactive dye according to claim 1, in which R₁, R₂ and R₃ are hydrogen.

3. A reactive dye according to claim 1, in which A is hydrogen or $C_1$-$C_4$ alkyl which is unsubstituted or substituted by hydroxyl, sulfo, carboxyl or sulfato.

4. A reactive dye according to claim 1, in which B is a $C_2$-$C_6$ alkylene radical which can be interrupted by 1, 2 or 3 members —O— and is unsubstituted or substituted by hydroxyl or sulfato.

5. A reactive dye according to claim 1, in which Q₁ is hydrogen, amino, fluorine or a radical of the formula

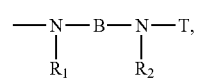   (2a)

in which R₁, R₂, B and T are as defined in claim 1.

6. A reactive dye according to claim 1, which has the formula

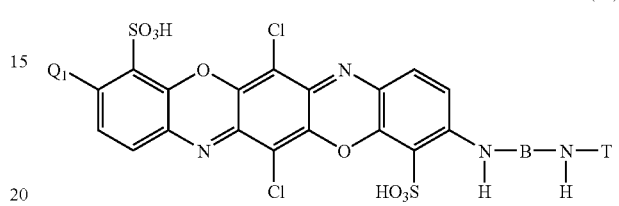   (1a)

in which Q₁, B and T are as defined in claim 1.

7. A reactive dye according to claim 6, in which Q₁ is hydrogen, amino, flourine or a radical of the formula

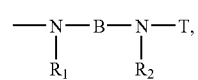   (2a)

R₁ and R₂ are hydrogen,
B is 1,2-ethylene, 1,2-propylene or 1,3-propylene,
T is a radical of the formula —CO—(CH₂)ₘ—SO₂—Y   (3a), —CO—CH(Hal)-CH₂-Hal   (3b) or —CO—C(Hal)=CH₂   (3c), Hal is bromine,
Y is vinyl or β-chloroethyl, and
m is the number 2 or 3.

8. A process for the preparation of a reactive dye according to claim 1, which comprises subjecting a compound of the formula

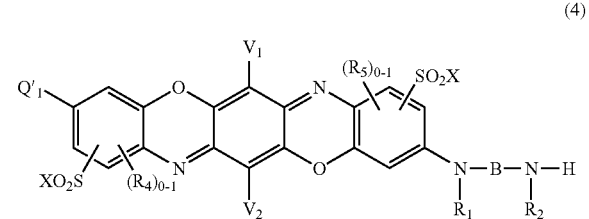   (4)

to a condensation reaction in any desired sequence with a compound of the formula

Z-T   (5), to give a compound of the formula

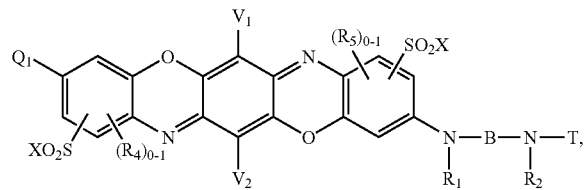
(1)

in which $Q'_1$ is hydrogen, halogen or a radical of the formula

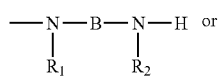
(2a')

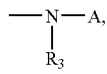
(2b)

$Q_1$, $R_1$, $R_2$, $R_3$, $(R_1)_{0-1}$, $(R_5)_{0-1}$, A, B, $V_1$, $V_2$ and T are as defined in claim 1, and Z is a leaving group.

9. A method of dyeing or printing fibre material comprising applying a reactive dye according to claim 1 to the fibre material and fixing the reactive dye to the fibre material.

10. The method according to claim 9, wherein the fibre material is silk, leather, wool, polyamide fibres, polyester fibres, polyurethane, cotton, linen hemp or blends thereof.

* * * * *